(12) United States Patent
Tanaka et al.

(10) Patent No.: US 12,401,182 B2
(45) Date of Patent: Aug. 26, 2025

(54) WIRE HARNESS

(71) Applicant: SUMITOMO WIRING SYSTEMS, LTD., Yokkaichi (JP)

(72) Inventors: Kosuke Tanaka, Yokkaichi (JP); Katsutoshi Izawa, Yokkaichi (JP); Ryuta Saito, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 160 days.

(21) Appl. No.: 18/027,552

(22) PCT Filed: Aug. 3, 2021

(86) PCT No.: PCT/JP2021/028715
§ 371 (c)(1),
(2) Date: Mar. 21, 2023

(87) PCT Pub. No.: WO2022/074922
PCT Pub. Date: Apr. 14, 2022

(65) Prior Publication Data
US 2023/0378735 A1 Nov. 23, 2023

(30) Foreign Application Priority Data
Oct. 5, 2020 (JP) .................... 2020-168194

(51) Int. Cl.
*B60R 16/02* (2006.01)
*H02G 3/00* (2006.01)
*H02G 3/04* (2006.01)

(52) U.S. Cl.
CPC .......... *H02G 3/26* (2013.01); *B60R 16/0215* (2013.01); *H02G 3/0462* (2013.01)

(58) Field of Classification Search
CPC .... B60R 6/207; B60R 6/0215; H02G 3/0418; H02G 3/0468; H02G 3/0481; H02G 3/32; H01B 7/0045
See application file for complete search history.

(56) References Cited

U.S. PATENT DOCUMENTS

| | | | |
|---|---|---|---|
| 5,160,105 A * | 11/1992 | Miller | A47C 7/002 248/188.9 |
| 5,664,520 A * | 9/1997 | Latimer, III | E05C 17/04 16/431 |

(Continued)

FOREIGN PATENT DOCUMENTS

| | | | |
|---|---|---|---|
| JP | 2009038899 A * | 2/2009 | H02G 3/30 |
| JP | 2013-055760 A | 3/2013 | |

(Continued)

OTHER PUBLICATIONS

Oct. 19, 2021 Search Report issued in International Patent Application No. PCT/JP2021/028715.

*Primary Examiner* — Paresh Paghadal
(74) *Attorney, Agent, or Firm* — Oliff PLC (57) ABSTRACT

A wire harness including: an electric wire; an exterior tube that covers an outer periphery of the electric wire; a path regulator that extends along a lengthwise direction of the exterior tube while covering a portion in a circumferential direction of an outer periphery of the exterior tube, and regulates a path along which the electric wire is routed; and a fixing member that holds the path regulator and is fixed to a vehicle body.

8 Claims, 4 Drawing Sheets

(56) References Cited

U.S. PATENT DOCUMENTS

| | | | | |
|---|---|---|---|---|
| 7,278,190 | B2* | 10/2007 | Fischer | F16L 3/223 |
| | | | | 248/74.2 |
| 7,422,181 | B2* | 9/2008 | Süßenbach | B60T 17/046 |
| | | | | 174/664 |
| 11,378,214 | B2* | 7/2022 | Wolf | F16L 3/1222 |
| 2007/0128929 | A1* | 6/2007 | Oga | F16L 3/1025 |
| | | | | 439/578 |
| 2008/0116324 | A1* | 5/2008 | Holder | F16L 3/1226 |
| | | | | 248/65 |
| 2009/0166480 | A1* | 7/2009 | Sakata | H02G 3/0691 |
| | | | | 248/71 |
| 2014/0196929 | A1 | 7/2014 | Okuhara | |
| 2014/0299722 | A1* | 10/2014 | Sampson | F16L 3/123 |
| | | | | 248/74.2 |
| 2015/0083462 | A1 | 3/2015 | Yoshida et al. | |
| 2017/0133827 | A1* | 5/2017 | Sugino | H05K 9/0098 |
| 2019/0049142 | A1* | 2/2019 | Balakrishna | F24F 13/22 |
| 2019/0089142 | A1* | 3/2019 | Sugino | H02G 3/34 |
| 2022/0073015 | A1 | 3/2022 | Kinoshita | |

FOREIGN PATENT DOCUMENTS

| | | |
|---|---|---|
| JP | 2013-252024 A | 12/2013 |
| JP | 2017-103894 A | 6/2017 |
| JP | 2020-102991 A | 7/2020 |

* cited by examiner

WIRE HARNESS

BACKGROUND

The present disclosure relates to a wire harness.

Conventionally, a wire harness that includes a corrugated tube that covers the outer periphery of an electric wire member, and a path regulating member that covers a portion in the circumferential direction of the corrugated tube and regulates a path along which the electric wire member is routed is known (for example, see JP 2013-55760A).

The corrugated tube of the wire harness described in JP 2013-55760A includes a slit formed along the lengthwise direction thereof. The path regulating member includes a path retaining member provided along the outer periphery of the corrugated tube, and an attachment member provided in the slit. The attachment member is configured to be engageable with the inner peripheral side portion of the slit and the outer peripheral side portion of the path retaining member. The corrugated tube, the path retaining member, and the attachment member are fixed together by, for example, winding a piece of tape around them, and the path of the electric wire member is thereby regulated.

In addition, a configuration is conceivable in which, for example, a belt clamp is wound around and collectively holds the integrated corrugated tube and path regulating member, and is fixed to a vehicle body, thereby fixing the wire harness to the vehicle body.

SUMMARY

However, for example, in a configuration in which a path regulating member is held by a fixing member such as a belt clamp as described above, there is a risk that the path regulating member will rotate in the circumferential direction relative to the fixing member. Moreover, rotation of the path regulating member relative to the vehicle body can cause a section of the corrugated tube that is not covered by the path regulating member to be exposed to the outside, for example, to oppose the ground, and accordingly, can cause a reduction in the durability of the wire harness.

An exemplary aspect of the disclosure provides a wire harness capable of suppressing rotation of a path regulating member relative to a fixing member that is fixed to a vehicle body.

A wire harness according to the present disclosure includes: an electric wire; an exterior tube that covers an outer periphery of the electric wire; a path regulator that extends along a lengthwise direction of the exterior tube while covering a portion in a circumferential direction of an outer periphery of the exterior tube, and regulates a path along which the electric wire is routed; and a fixing member that holds the path regulator and is fixed to a vehicle body, wherein the path regulator includes: an insertion port that is an opening that extends along a lengthwise direction of the path regulator over an entire length of the path regulator and is configured to enable the exterior tube to be inserted thereinto, and a first end and a second end that are positioned on opposite sides to each other in a circumferential direction of the path regulator, and form the insertion port, the fixing member includes an engagement that protrudes toward the insertion port, and the engagement is capable of coming into contact with at least one of the first end and the second end in the circumferential direction of the path regulator.

With the wire harness according to the present disclosure, it is possible to suppress rotation of a path regulator relative to a fixing member that is fixed to a vehicle body.

DETAILED DESCRIPTION OF EMBODIMENTS

Description of Embodiments of Disclosure

First, embodiments of the present disclosure will be listed and described.

[1] A wire harness according to the present disclosure includes:

an electric wire member, a tubular exterior member that covers an outer periphery of the electric wire member, a path regulating member that extends along a lengthwise direction of the exterior member while covering a portion in a circumferential direction of the outer periphery of the exterior member, and regulates a path along which the electric wire member is routed, and a fixing member that holds the path regulating member and is fixed to a vehicle body, the path regulating member includes: an insertion port that is an opening that extends along the lengthwise direction of the path regulating member over the entire length of the path regulating member and is configured to enable the exterior member to be inserted thereinto, and a first end portion and a second end portion that are positioned on opposite sides to each other in the circumferential direction of the path regulating member, and form the insertion port, the fixing member includes an engagement portion that protrudes toward the insertion port, and the engagement portion is capable of coming into contact with at least one of the first end portion and the second end portion in the circumferential direction of the path regulating member.

According to the above configuration, the path regulating member can be retrofitted to the outer periphery of the exterior member through the insertion port. The engagement portion of the fixing member can come into contact with at least one of the first end portion and the second end portion that form the insertion port in the circumferential direction of the path regulating member, and thus the fixing member can keep the path regulating member from rotating relative to the fixing member in the circumferential direction, while holding the path regulating member.

[2] Preferably, the engagement portion includes a narrow portion whose width decreases toward a leading end side of the engagement portion when viewed from the lengthwise direction of the path regulating member.

According to the above configuration, the engagement portion includes the narrow portion whose width decreases toward the leading end side of the engagement portion when viewed from the lengthwise direction of the path regulating member, and thus the engagement portion can be easily inserted into the insertion port, which facilitates attachment.

[3] Preferably, the fixing member includes a main body portion and a lid portion that is fixable to the main body portion, and encloses and holds the path regulating member in cooperation with the main body portion while fixed to the main body portion.

According to the above configuration, the fixing member includes the main body portion and the lid portion that is fixable to the main body portion and encloses and holds the path regulating member in cooperation with the main body portion while fixed to the main body portion, and thus the fixing member can be retrofitted to the path regulating member.

[4] Preferably, the engagement portion protrudes from a vehicle body opposing portion that opposes an attachment surface of the vehicle body.

According to the above configuration, the engagement portion protrudes from the vehicle body opposing portion that opposes the attachment surface of the vehicle body, and thus the insertion port of the path regulating member faces the attachment surface side. Thus, for example, the insertion port can be kept from facing downward so as to oppose the ground.

[5] Preferably, a plurality of fixing members are provided in the lengthwise direction of the path regulating member.

According to the above configuration, since a plurality of fixing members are provided in the lengthwise direction of the path regulating member, rotation of the path regulating member relative to the fixing members in the circumferential direction can be suppressed at a plurality of locations in the lengthwise direction of the path regulating member. Thus, it is possible to more firmly suppress rotation of the path regulating member.

[6] Preferably, the exterior member is a corrugated tube that has a bellows structure in which an annular protrusion and an annular recess are alternately provided in a continuous manner along the lengthwise direction of the exterior member, and the engagement portion includes a protrusion that enters the annular recess.

According to the above configuration, the engagement portion includes the protrusion that enters the annular recess of the corrugated tube, and thus it is possible to suppress movement of the corrugated tube relative to the fixing member in the lengthwise direction of the corrugated tube.

[7] Preferably, the wire harness further includes a slide regulating member that regulates movement of the path regulating member relative to the exterior member in the lengthwise direction of the exterior member, and the path regulating member is allowed to move relative to the fixing member in the lengthwise direction of the exterior member in a case where the slide regulating member is not attached.

According to the above configuration, the slide regulating member regulates movement of the path regulating member relative to the exterior member in the lengthwise direction of the exterior member. In addition, the path regulating member is allowed to move relative to the fixing member in the lengthwise direction of the exterior member in a state where no slide regulating member is attached, and thus it is possible to adjust the position of the path regulating member.

[8] Preferably, the path regulating member includes a protruding portion that protrudes from an inner surface of at least one of the first end portion and the second end portion toward the exterior member, and comes into contact with an outer surface of the exterior member.

According to the above configuration, the path regulating member includes the protruding portion that protrudes from the inner surface of at least one of the first end portion and the second end portion and comes into contact with the outer surface of the exterior member, and thus it is possible to keep the path regulating member from coming loose from the exterior member through the insertion port.

[9] Preferably, the protruding portion protrudes from an inner surface of at least one of a leading end of the first end portion and a leading end of the second end portion.

According to the above configuration, for example, compared with a case where the protruding portion protrudes from the inner surface of the path regulating member at a position slightly away from the leading end of the first end portion or the leading end of the second end portion, it is possible to further keep the path regulating member from coming loose from the exterior member through the insertion port.

DESCRIPTION OF EMBODIMENTS OF DISCLOSURE

Specific examples of a wire harness according to the present disclosure will be described below with reference to the drawings. In the drawings, part of a structure may be exaggerated or simplified for convenience of explanation. In addition, the dimensional ratio of each part may differ between drawings. The present disclosure is not limited to these examples, but is defined by the claims and intended to include all modifications within the meaning and scope equivalent to the claims. The term "orthogonal" as used herein includes not only being exactly orthogonal but also being substantially orthogonal within the range in which the functions and effects according to the embodiment are achieved.

Overall Configuration of Wire Harness 10

Figure 1:
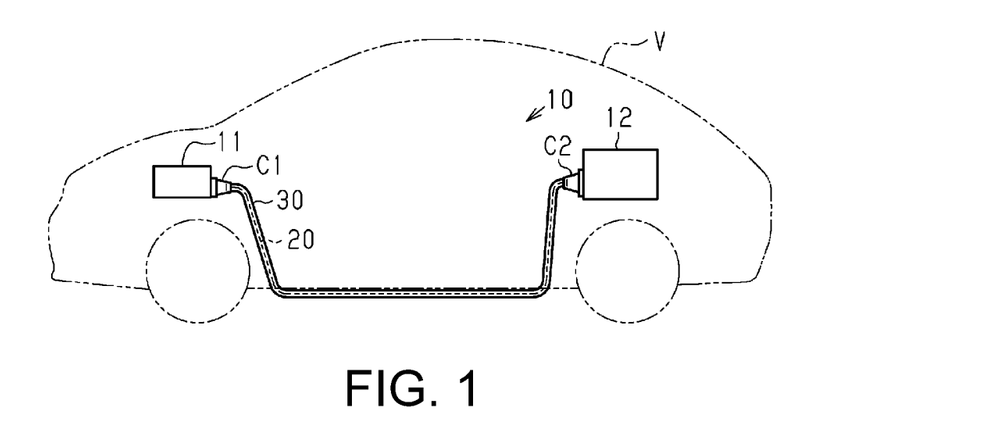
FIG. 1 is a schematic diagram of a configuration showing a wire harness according to an embodiment of the present disclosure.

A wire harness 10 shown in FIG. 1 electrically connects two or three or more electric devices. The wire harness 10 electrically connects an inverter 11 installed on the front side of a vehicle V such as a hybrid vehicle or an electric vehicle and a high-voltage battery 12 installed rearward of the inverter 11 in the vehicle V, for example. The wire harness 10 is, for example, routed so as to pass under the floor of the vehicle V. For example, the wire harness 10 is routed so that an intermediate portion of the wire harness in the longitudinal direction thereof extends outside the vehicle interior such as under the floor of the vehicle V.

The inverter 11 is connected to a wheel driving motor (not shown) that is a motive power source for vehicle travel. The inverter 11 generates AC power from DC power of the high-voltage battery 12, and supplies the resultant AC power to the motor. The high-voltage battery 12 is, for example, a battery capable of supplying a voltage of several hundred volts.

Figure 2:
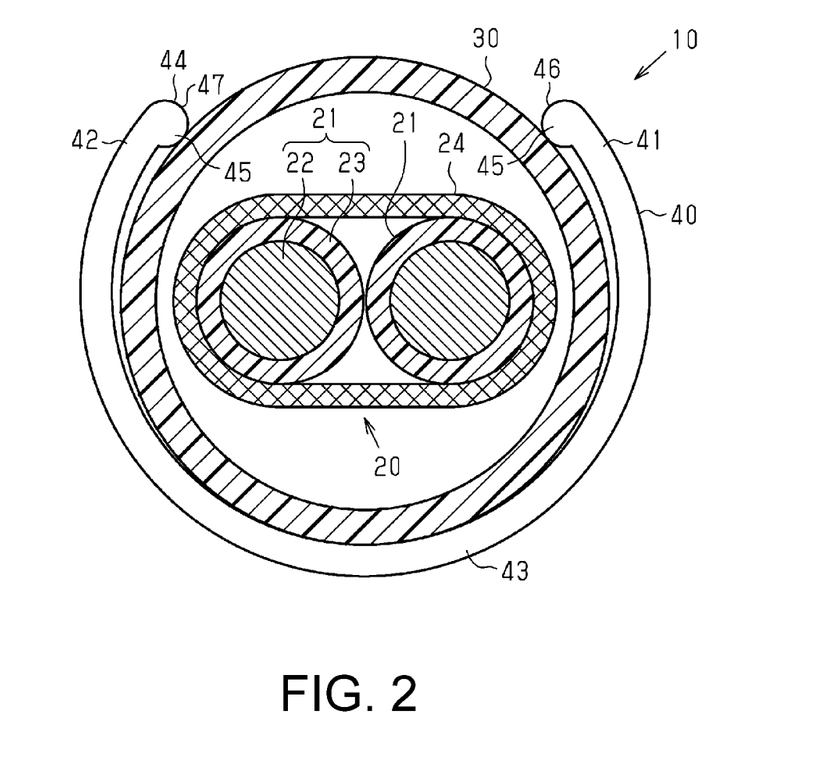
FIG. 2 is a cross-sectional view showing a portion of the wire harness according to the embodiment.

As shown in FIGS. 1 and 2, the wire harness 10 includes an electric wire member 20 (electric wire) that electrically connects the above electric devices, a tubular exterior member 30 (exterior tube) that covers the outer periphery of the electric wire member 20, and a path regulating member 40 (path regulator) that covers the outer periphery of the exterior member 30 and regulates a path (hereinafter, referred to as a "routing path") along which the electric wire member 20 is routed. [0029] In addition, as shown in FIG.

Figure 3:
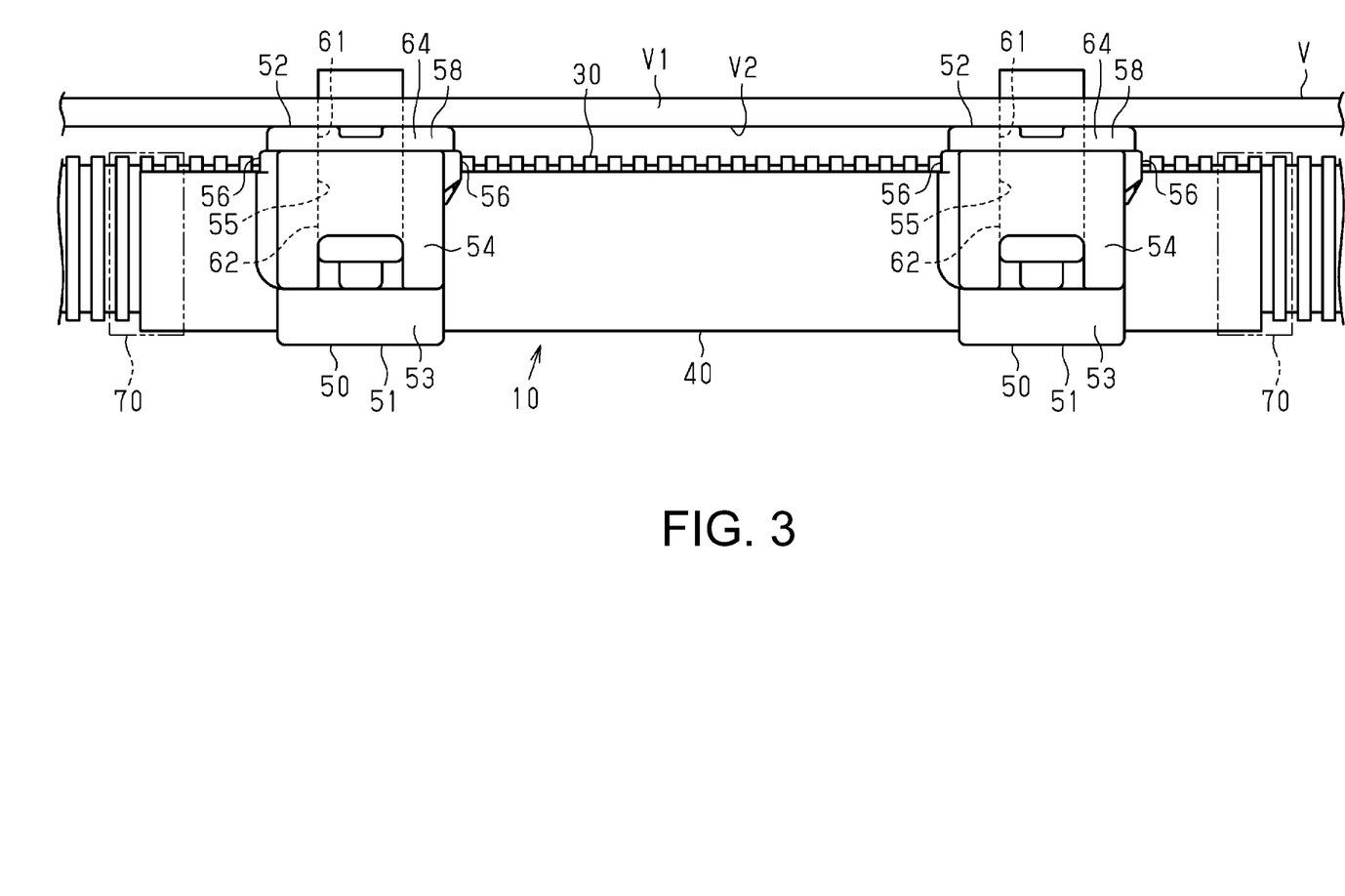
FIG. 3 is a side view of the wire harness according to the embodiment when fixed to a vehicle body.

3, the wire harness 10 includes fixing members 50 that hold the path regulating member 40, and are fixed to a vehicle body V1 of the vehicle V. A pair of connectors C1 and C2 are respectively attached to two end portions of the electric wire member 20.

Configuration of Electric Wire Member 20

The electric wire member 20 includes one or more electric wires 21 and a braided member 24 that collectively covers the outer peripheries of the electric wires 21. The electric wire member 20 according to the present embodiment includes two electric wires 21. One end portion of the electric wire member 20 is connected to the inverter 11 via the connector C1, and the other end portion of the electric wire member 20 is connected to the high-voltage battery 12 via the connector C2. The electric wire member 20 is formed in an elongated shape so as to extend in the front-rear direction of the vehicle, for example. The electric wires 21 are high-voltage electric wires that can support a high voltage/large current, for example. Each electric wire 21 may be a non-shielded electric wire that does not have an electromagnetic shield structure, or a shielded electric wire that has an electromagnetic shield structure, for example.

Configuration of Electric Wires 21

As shown in FIG. 2, the electric wires 21 are coated electric wires that each include a core wire 22 made of a conductor and an insulation coating 23 that covers the outer periphery of the core wire 22.

Configuration of Core Wire 22

A twisted wire formed by twisting a plurality of metal strands together, a columnar conductor made of a single columnar metal bar that has a solid structure, a tubular conductor that has a hollow structure, or the like can be used as the core wire 22, for example. In addition, for example, a combination of a plurality of types of conductors such as a twisted wire, a columnar conductor, a tubular conductor, and the like can also be used as the core wire 22. Examples of the columnar conductor can include a single core wire, a busbar, and the like. The core wire 22 according to the present embodiment is a twisted wire. A metal material that is copper-based, aluminum-based, or the like can be used as the material of the core wire 22, for example.

A cross-sectional shape (hereinafter, referred to as a "transverse cross-sectional shape") of the core wire 22 taken along a plane orthogonal to the lengthwise direction of the core wire 22, in other words the lengthwise direction of the electric wire 21 can have any shape. The transverse cross-sectional shape of the core wire 22 has a circular shape, a semicircular shape, a polygonal shape, a square shape, a flat shape, or the like. The transverse cross-sectional shape of the core wire 22 according to the present embodiment is circular.

Configuration of Insulation Coating 23

The insulation coating 23 covers the entire outer circumference of the outer peripheral surface of the core wire 22, for example. The insulation coating 23 is made of an insulating material such as a synthetic resin. A synthetic resin whose main component is a polyolefin-based resin such as cross-linked polyethylene or cross-linked polypropylene can be used as the material of the insulation coating 23. Also, as the material of the insulation coating 23, one kind of material can be used, or two or more kinds of materials can be used in combination as appropriate.

Configuration of Braided Member 24

The braided member 24 is formed in a tubular shape so as to collectively cover the outer peripheries of the electric wires 21 as a whole, for example. The braided member 24 is provided so as to cover the outer peripheries of the electric wires 21 in the lengthwise direction of the electric wires 21 over substantially the entire length thereof, for example. A braided wire formed by braiding a plurality of metal strands, or a braided wire formed by braiding a metal strand and a resin strand in combination can be used as the braided member 24. A metal material that is copper-based, aluminum-based, or the like can be used as the material of the metal strand, for example. Although not illustrated, the braided member 24 is grounded at the connector C1 or C2, or the like.

Configuration of Exterior Member 30

As shown in FIG. 3, the exterior member 30 is formed in a cylindrical shape so as to cover the outer periphery of the electric wire member 20 over the entire circumferential direction thereof. The exterior member 30 is sealed entirely in the circumferential direction. The exterior member 30 is provided so as to cover the outer periphery of a portion in the lengthwise direction of the electric wire member 20, for example. The exterior member 30 according to the present embodiment is a corrugated tube that has a bellows structure in which annular protrusions 31 and annular recesses 32 are alternately provided in a continuous manner along the lengthwise direction of the exterior member 30. The exterior member 30 is flexible.

A conductive resin material or a nonconductive resin material can be used as the material of the exterior member 30, for example. A synthetic resin such as polyolefin, polyamide, polyester, or an ABS resin can be used as the resin material.

Configuration of Path Regulating Member 40

Figure 4:
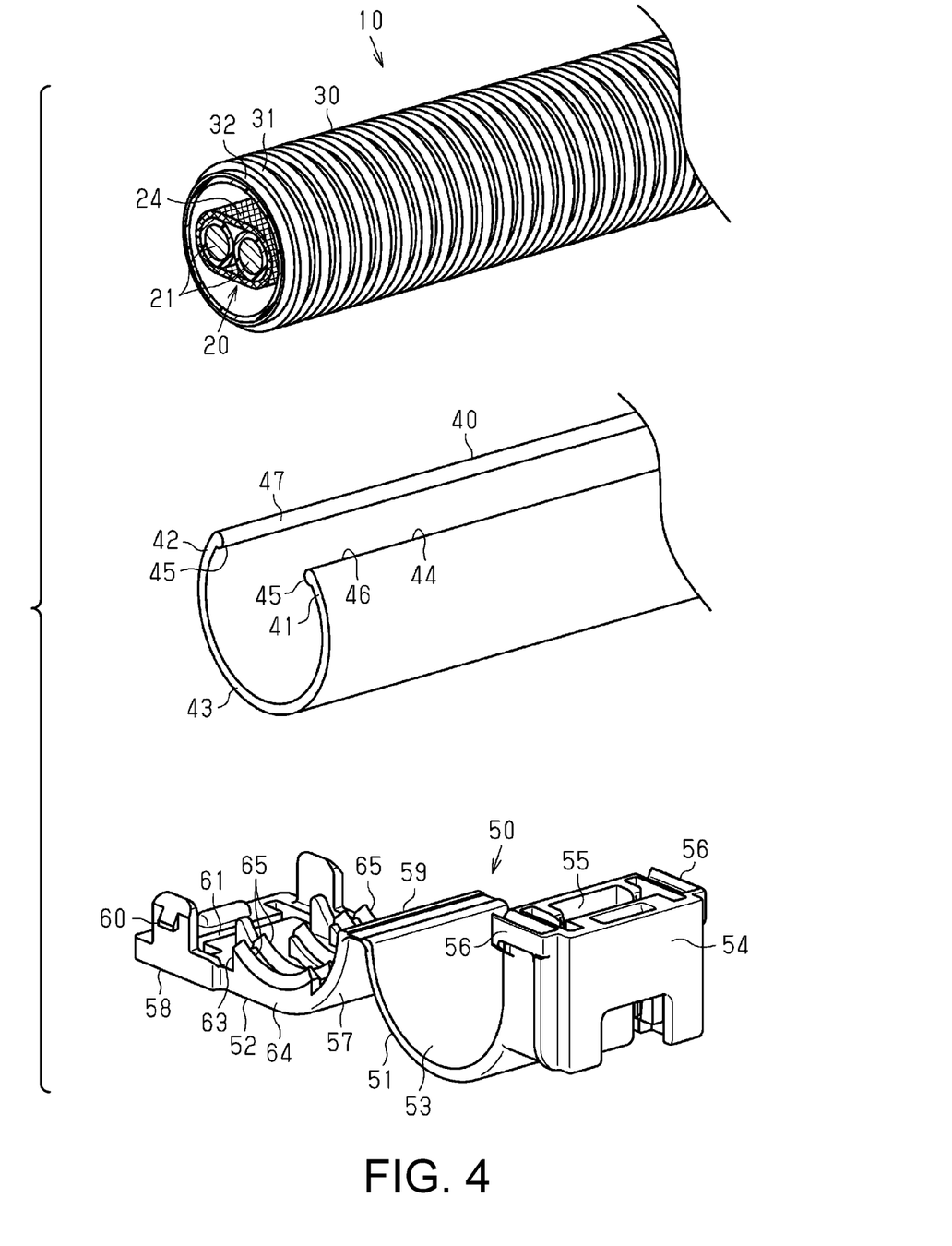
FIG. 4 is an exploded perspective view of a portion of the wire harness according to the embodiment.

As shown in FIGS. 2 and 4, the path regulating member 40 covers a portion in the circumferential direction of the outer periphery of the exterior member 30 and extends along the lengthwise direction of the exterior member 30. Note that the path regulating member 40 covers an area that is larger than half of the outer periphery of the exterior member 30. The path regulating member 40 according to the present embodiment is attached to the outer periphery of a portion of the routing path of the electric wire member where the exterior member 30 extends linearly, such as a portion under the floor of the vehicle V.

The path regulating member 40 is made of resin. A synthetic resin such as polypropylene, polyamide, or polyacetal can be used as the material of the path regulating member 40. The path regulating member 40 can be manufactured using a known manufacturing method such as extrusion molding or injection molding. The cross-sectional shape of the path regulating member 40 according to the present embodiment is constant when viewed from the lengthwise direction thereof. The path regulating member 40 is an extrusion-molded component.

The path regulating member 40 includes an insertion port 44 that is an opening extending in the lengthwise direction of the path regulating member 40, a first end portion 41 and a second end portion 42 that form the insertion port 44, and a coupling portion 43 that couples the first end portion 41 and the second end portion 42. In other words, the path regulating member 40 includes the coupling portion 43 formed so as to cover a portion in the circumferential direction of the exterior member 30, the first end portion 41 and the second end portion 42 provided at two end portions of the coupling portion 43, and the insertion port 44 that is formed by the first end portion 41 and the second end portion 42.

The first end portion 41 and the second end portion 42 are positioned on opposite sides to each other in the circumferential direction of the path regulating member 40. The first end portion 41 and the second end portion 42 are spaced apart from each other, sandwiching the insertion port 44 in the circumferential direction of the path regulating member 40. The transverse cross-sectional shape of the first end portion 41, the second end portion 42, and the coupling portion 43 is an arc shape.

The path regulating member 40 includes a pair of protruding portions 45 (protrusions) that protrude toward the exterior member 30 inserted into the path regulating member 40, and come into contact with the outer surface of the exterior member 30, more specifically, the outer surfaces of annular protrusions 31. One of the pair of protruding portions 45 protrudes from the inner surface of the first end portion 41. The other of the pair of protruding portions 45 protrudes from the inner surface of the second end portion 42. The protruding portions 45 protrude from the inner surfaces of a leading end 46 of the first end portion 41 and a leading end 47 of the second end portion 42. The transverse cross-sectional shape of each protruding portion 45 is semicircular, for example. The protruding portions 45 extend along the lengthwise direction of the path regulating member 40 over the entire length thereof.

The leading end 46 of the first end portion 41 and the leading end 47 of the second end portion 42 are curved as viewed from the lengthwise direction of the path regulating member 40. In other words, the transverse cross-sectional shape of each of the leading end 46 of the first end portion 41 and the leading end 47 of the second end portion 42 is curved. Specifically, the transverse cross-sectional shape of each of the leading end 46 of the first end portion 41 and the leading end 47 of the second end portion 42 is semicircular.

The insertion port 44 extends along the lengthwise direction of the path regulating member 40 over the entire length thereof. The opening width of the insertion port 44, that is to say, the shortest distance between the first end portion 41 and the second end portion 42 is smaller than the outer diameter of the exterior member 30.

When the exterior member 30 is inserted into the insertion port 44 from a direction orthogonal to the lengthwise direction, the path regulating member 40 elastically deforms, thus increasing the opening width of the insertion port 44. Once the exterior member 30 is inserted into the path regulating member 40, the path regulating member 40 elastically deforms so as to return to its original shape. Accordingly, the above opening width decreases to a width that is smaller than the outer diameter of the exterior member 30, and thus the path regulating member 40 is attached to the exterior member 30.

Configuration of Fixing Member 50

As shown in FIG. 3, the fixing members 50 hold the path regulating member 40 attached to the exterior member 30, and are fixed to an attachment surface V2 of the vehicle body V1. The attachment surface V2 according to the present embodiment is a surface outside the vehicle interior under the floor of the vehicle V, and is a surface opposing the ground. A plurality of fixing members 50 are provided in the lengthwise direction of the path regulating member 40. In the present embodiment, two fixing members 50 are provided in the lengthwise direction of the path regulating member 40.

Figure 5:
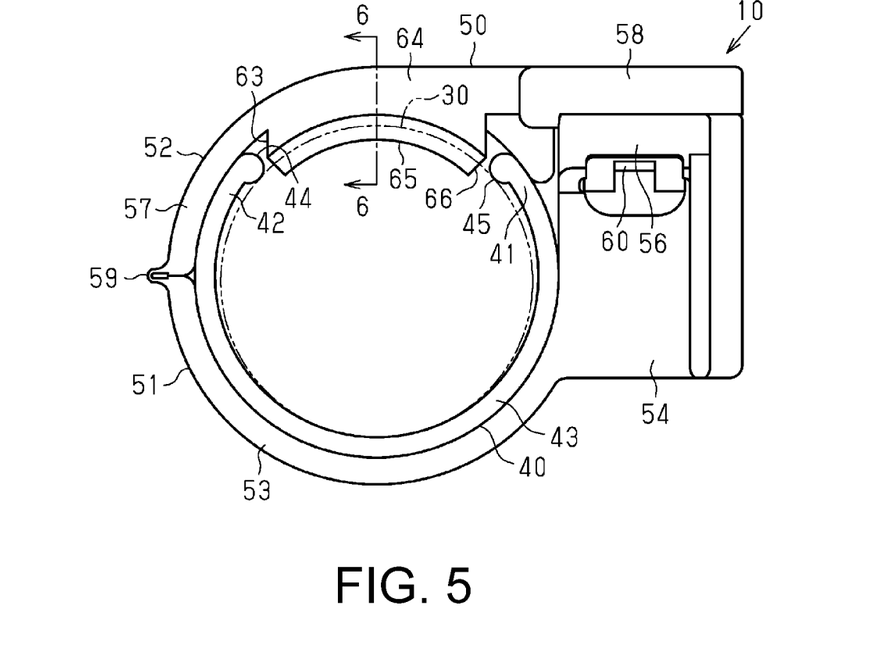
FIG. 5 is a front view showing a portion of the wire harness according to the embodiment.

As shown in FIGS. 3 to 5, each of the fixing members 50 is made of resin. The fixing member 50 includes a main body portion 51 (main body) and a lid portion 52 (lid). The lid portion 52 can be fixed to the main body portion 51, and enclose and hold the path regulating member 40 in cooperation with the main body portion 51 while fixed to the main body portion 51.

To be specific, as shown in FIG. 5, the main body portion 51 includes an arc portion 53 formed in an arc shape so as to cover a portion of the outer periphery of the path regulating member 40 as viewed from the lengthwise direction of the path regulating member 40, and a fixing portion 54 provided at one end of the arc portion 53.

The fixing portion 54 is formed in a substantially quadratic prism shape. As shown in FIGS. 3 and 4, the fixing portion 54 includes a fixing hole 55 that extends therethrough along a direction orthogonal to the attachment surface V2. The fixing portion 54 is also provided with a claw engagement portion 56.

As shown in FIG. 5, the lid portion 52 includes a lid arc portion 57 formed in an arc shape so as to cover a portion of the outer periphery of the path regulating member 40 as viewed from the lengthwise direction of the path regulating member 40, and an extension portion 58 provided at one end of the lid arc portion 57.

The lid portion 52 is coupled to the main body portion 51 via a hinge portion 59. Specifically, the other end of the arc portion 53 of the main body portion 51 is coupled to the other end of the lid arc portion 57 of the lid portion 52 via the hinge portion 59. The hinge portion 59 according to the present embodiment is a thin portion. The main body portion 51 and the lid portion 52 are an integrally-molded component integrally formed via the hinge portion 59. The main body portion 51 and the lid portion 52 can rotate relative to each other about the hinge portion 59.

As a result of being rotated relative to the main body portion 51 and brought into a closed state, the lid portion 52 can enclose the path regulating member 40 in cooperation with the main body portion 51. In addition, by rotating the lid portion 52 relative to the main body portion 51 and bringing it into an open state, the path regulating member 40 can be disposed between the lid portion 52 and the main body portion 51 from the outside. A claw portion 60 that can be engaged with the claw engagement portion 56 of the main body portion 51 is provided on the extension portion 58 of the lid portion 52. When the lid portion 52 is brought into the closed state, the claw portion 60 is engaged with the claw engagement portion 56. When the lid portion 52 is fixed to the main body portion 51 as a result of the claw portion 60 being engaged with the claw engagement portion 56 in this manner, the lid portion 52 can enclose and hold the path regulating member 40 in cooperation with the main body portion 51. In addition, as shown in FIGS. 3 and 4, a communication hole 61 that is in communication with the fixing hole 55 of the fixing portion 54 in the closed state is provided in the extension portion 58.

As shown in FIG. 3, the fixing members 50 are fixed to the vehicle body V1 in a state where the lid portions 52 are in contact with the attachment surface V2 of the vehicle body V1. Fixing pieces 62 that extend in a direction orthogonal to the attachment surface V2, that is, toward the ground are provided on the attachment surface V2, for example. The fixing members 50 are then fixed to the attachment surface V2 as a result of the fixing piece 62 being passed through the communication hole 61 and the fixing hole 55 and engaging with an edge portion of the fixing hole 55 or the like.

As shown in FIG. 5, the fixing member 50 includes an engagement portion 63 (engagement) that protrudes toward the insertion port 44 of the held path regulating member 40. In other words, the fixing member 50 includes the engagement portion 63 that protrudes so as to be disposed inside the insertion port 44 of the held path regulating member 40. The engagement portion 63 can come into contact with the first end portion 41 and the second end portion 42 in the circumferential direction of the path regulating member 40. The engagement portion 63 is disposed between the first end portion 41 and the second end portion 42 in the circumferential direction of the path regulating member 40, and, when the path regulating member 40 attempts to rotate relative to the fixing member 50 in the circumferential direction, the engagement portion 63 comes into contact with the first end portion 41 or the second end portion 42, and regulates rotation of the path regulating member 40.

The engagement portion 63 is provided on the lid portion 52. Specifically, the engagement portion 63 protrudes from a vehicle body opposing portion 64 of the lid portion 52 that opposes the attachment surface V2 of the vehicle body V1, toward the insertion port 44. In other words, the engagement portion 63 protrudes from the attachment surface V2 side of the vehicle body V1. The engagement portion 63 protrudes toward the ground. Accordingly, the insertion port 44 of the path regulating member 40 faces upward, that is, the attachment surface V2 side.

Figure 6:
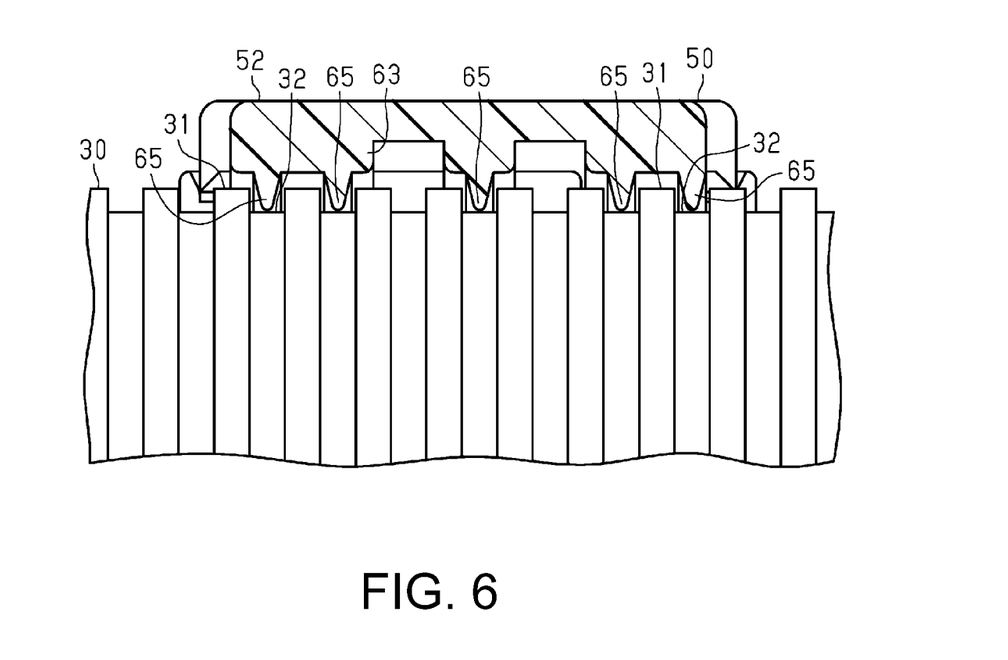
FIG. 6 is a cross-sectional view taken along the line 6-6 in FIG. 5.

As shown in FIG. 6, the engagement portion 63 includes protrusions 65 that enter annular recesses 32 of the exterior member 30. The protrusions 65 protrude from the engagement portion 63. A plurality of protrusions 65 are provided in the lengthwise direction of the exterior member 30. In the present embodiment, five protrusions 65 are provided in the lengthwise direction of the exterior member 30, and correspondingly enter annular recesses 32 of the exterior member 30. Accordingly, movement of the exterior member 30 relative to the fixing member 50 in the lengthwise direction of the exterior member 30 is suppressed.

As shown in FIG. 5, the engagement portion 63 includes a narrow portion 66 whose width decreases toward a leading end side thereof when viewed from the lengthwise direction of the path regulating member 40. Each protrusion 65 is provided with a narrow portion 66 according to the present embodiment. In other words, when viewed from the lengthwise direction of the path regulating member 40, the width of the protrusion 65 decreases toward the leading end side thereof so as to form the narrow portion 66.

As shown in FIG. 3, the wire harness 10 includes slide regulating members 70 (slide regulators) for regulating movement of the path regulating member 40 relative to the exterior member 30 in the lengthwise direction of the exterior member 30. The slide regulating members 70 according to the present embodiment are pieces of adhesive tape. The slide regulating members 70 regulate movement of the path regulating member 40 relative to the exterior member 30 by being wound from the path regulating member 40 to the exterior member 30, respectively at the two ends of the path regulating member 40. When the slide regulating members 70 are not attached, the path regulating member 40 is allowed to move relative to the fixing members 50 in the lengthwise direction of the exterior member 30. That is to say, the fixing members 50 and the path regulating member 40 have no sections that are directly engaged with each other in the lengthwise direction of the path regulating member 40. Thus, the position of the path regulating member 40 relative to the fixing members 50 in the lengthwise direction of the exterior member 30 can be adjusted when the slide regulating members 70 are not attached. Note that, also in this case, the engagement portions 63 keep the path regulating member from rotating relative to the fixing members 50 in the circumferential direction.

Functions of the present embodiment will be described.

With the wire harness 10 according to the present embodiment, the path regulating member 40 can be retrofitted to the outer periphery of the exterior member 30 through the insertion port 44. In other words, the path regulating member 40 can be attached to the exterior member 30 from a direction orthogonal to the lengthwise direction of the exterior member 30. The path regulating member 40 includes the pair of protruding portions 45 that come into contact with the outer surface of the exterior member 30, and thus it is possible to suppress the path regulating member 40 from coming loose from the exterior member 30 through the insertion port 44.

In addition, the wire harness 10 can be fixed as a result of the path regulating member 40 attached to the exterior member 30 being held by the fixing members 50, and the fixing members 50 being fixed to the vehicle body V1. At this time, the engagement portions 63 of the fixing members 50 can come into contact with the first end portion 41 and the second end portion 42 that form the insertion port 44 in the circumferential direction of the path regulating member 40, and thus the path regulating member 40 is kept from rotating relative to the fixing members 50 in the circumferential direction.

Functions of the present embodiment will be described.
(1) The path regulating member 40 can be retrofitted to the outer periphery of the exterior member 30 through the insertion port 44. In addition, the engagement portions 63 of the fixing members 50 that hold the path regulating member 40 and are fixed to the vehicle body V1 can come into contact with the first end portion 41 and the second end portion 42 that form the insertion port 44 in the circumferential direction of the path regulating member 40. Thus, the fixing members 50 can keep the path regulating member 40 from rotating relative to the fixing members 50 in the circumferential direction while holding the path regulating member 40. Thus, the path regulating member 40 is kept from rotating due to vibration that occurs when the vehicle V is travelling, for example, and the insertion port 44 is kept from facing downward so as to oppose the ground. As a result, for example, it is possible to suppress a decrease in the ability of the path regulating member 40 to protect the exterior member 30 from flying rocks and the like, and a decrease in the durability of the wire harness 10. In addition, the fixing members 50 that include the fixing portions 54 for fixing to the vehicle body include the engagement portions 63 that suppress rotation of the path regulating member 40, and thus it is possible to reduce the number of components compared with a case where their functions are realized using other members.
(2) The engagement portion 63 includes the narrow portions 66 whose width decreases toward the leading end side thereof when viewed from the lengthwise direction of the path regulating member 40, and thus the engagement portion 63 can be easily inserted into the insertion port 44, which facilitates attachment.
(3) The fixing members 50 each include the main body portion 51 and the lid portion 52 that can be fixed to the main body portion 51 and encloses and holds the path regulating member 40 in cooperation with the main body portion 51 while fixed to the main body portion 51, and thus the fixing members 50 can be retrofitted to the path regulating member 40. In other words, the fixing members 50 can be attached to the path regulating member 40 from a direction orthogonal to the lengthwise direction of the path regulating member 40.
(4) The engagement portion 63 protrudes from the vehicle body opposing portion 64 that opposes the attachment surface V2 of the vehicle body V1, and thus the insertion port 44 of the path regulating member 40 faces the attachment surface V2 side. Thus, for example, the insertion port 44 is kept from facing downward so as to oppose the ground.

(5) Since a plurality of fixing members 50 are provided in the lengthwise direction of the path regulating member 40, rotation of the path regulating member 40 relative to the fixing members 50 in the circumferential direction can be suppressed at a plurality of locations in the lengthwise direction of the path regulating member 40. Thus, it is possible to more firmly suppress rotation of the path regulating member 40.

(6) The engagement portion 63 includes the protrusions 65 that enter annular recesses 32 of the exterior member 30, and thus it is possible to suppress movement of the exterior member 30 relative to the fixing member 50 in the lengthwise direction of the exterior member 30.

(7) Movement of the path regulating member 40 relative to the exterior member in the lengthwise direction of the exterior member 30 is regulated by the slide regulating members 70. In addition, the path regulating member 40 is allowed to move relative to the fixing members 50 in the lengthwise direction of the exterior member 30 when no slide regulating member 70 is attached, and thus it is possible to adjust the position of the path regulating member 40.

(8) The path regulating member 40 includes the protruding portions 45 that protrude from the inner surfaces of the first end portion 41 and the second end portion 42 and come into contact with the outer surface of the exterior member 30, and thus it is possible to keep the path regulating member 40 from coming loose from the exterior member 30 through the insertion port 44.

(9) The protruding portions 45 protrude from the inner surfaces of the leading end 46 of the first end portion 41 and the leading end 47 of the second end portion 42. Thus, for example, compared with a case where the protruding portions 45 protrude from the inner surface of the path regulating member 40 at positions slightly away from the leading end 46 of the first end portion 41 and the leading end 47 of the second end portion 42, it is possible to further keep the path regulating member 40 from coming loose from the exterior member 30 through the insertion port 44.

MODIFIED EXAMPLES

The present embodiment can be modified and implemented as follows. The present embodiment and the modified examples below can be implemented in combination with each other as long as no technical contradictions arise.

In the above embodiment, the engagement portion 63 includes the narrow portions 66 whose width decreases toward the leading end side thereof when viewed from the lengthwise direction of the path regulating member 40, but there is no limitation thereto, and a configuration may also be adopted in which no narrow portion 66 is provided. In addition, in the above embodiment, each protrusion 65 is provided with a narrow portion 66, but there is no limitation thereto, and, for example, the engagement portion 63 itself may configure a narrow portion whose width decreases toward the leading end side when viewed from the lengthwise direction of the path regulating member 40.

In the above embodiment, a configuration is adopted in which the fixing members 50 each include the main body portion 51 and the lid portion 52, and can be retrofitted to the path regulating member 40, but there is no limitation thereto, and, for example, a configuration may also be adopted in which the lid portion 52 cannot move in a closed state. In this case, the fixing members cannot be retrofitted to the path regulating member 40, specifically, the fixing members cannot be attached to the path regulating member 40 from a direction orthogonal to the lengthwise direction of the path regulating member 40, and the path regulating member 40 needs to be passed through the fixing members in the lengthwise direction and attached thereto.

In the above embodiment, the lid portion 52 is coupled to the main body portion 51 via the hinge portion 59, but there is no limitation thereto, and the main body portion 51 and the lid portion 52 may be separate components. Note that, as a matter of course, even when a main body portion and a lid portion are separate components, the lid portion needs to be fixable to the main body portion, and be capable of enclosing and holding the path regulating member 40 in cooperation with the main body portion while fixed to the main body portion.

In the above embodiment, a configuration is adopted in which the lid portion 52 includes the claw portion 60, and when the lid portion 52 is brought into a closed state, the claw portion 60 is engaged with the claw engagement portion 56 of the main body portion 51, but the lid portion 52 may be fixed to the main body portion 51 using another configuration.

In the above embodiment, the engagement portion 63 protrudes from the vehicle body opposing portion 64 that opposes the attachment surface V2 of the vehicle body V1, but there is no limitation thereto, and the engagement portion 63 may protrude from another section.

In the above embodiment, two fixing members 50 are provided in the lengthwise direction of the path regulating member 40, but there is no limitation thereto, and a configuration may also be adopted in which one fixing member 50 or three or more fixing members 50 are provided in the lengthwise direction of the path regulating member 40.

In the above embodiment, the engagement portion 63 includes the protrusions 65 that enter annular recesses 32 of the exterior member 30, but there is no limitation thereto, and a configuration may also be adopted in which the protrusions 65 are not provided. In addition, the exterior member 30 is a corrugated tube in which the annular protrusions 31 and the annular recesses 32 are alternately provided in a continuous manner along the lengthwise direction, but another exterior member may be adopted. In addition, when an exterior member that does not include the annular recesses 32 is used, the protrusions 65 are unnecessary, and it is preferable that movement of the exterior member relative to the fixing members 50 in the lengthwise direction is suppressed using another configuration.

In the above embodiment, the wire harness 10 includes the slide regulating members 70 for regulating movement of the path regulating member 40 relative to the exterior member 30 in the lengthwise direction of the exterior member 30, but there is no limitation thereto, and a configuration may also be adopted in which the slide regulating members 70 are not provided. In addition, each slide regulating member 70 is a piece of adhesive tape, but a slide regulating member other than an adhesive tape may also be used.

In the above embodiment, a configuration is adopted in which the path regulating member 40 is allowed to move relative to the fixing members 50 in the lengthwise direction of the exterior member 30, in a state where no slide regulating member 70 is attached, but there is no limitation thereto, and a configuration may also be adopted in which the path regulating member 40 is not allowed to move relative to the fixing members 50 in the lengthwise direction of the exterior member 30. That is to say, a configuration may also be adopted in which each fixing member 50 and the path regulating member 40 include sections that are directly engaged with each other in the lengthwise direction of the path regulating member 40.

In the above embodiment, the path regulating member 40 includes the protruding portions 45 that protrude from the inner surfaces of the first end portion 41 and the second end portion 42 and come into contact with the outer surface of the exterior member 30, but there is no limitation thereto, and a configuration may also be adopted in which no protruding portions 45 are provided. In addition, the protruding portions 45 may protrude from the inner surface (of the path regulating member 40) at positions slightly away from the leading end 46 of the first end portion 41 and the leading end 47 of the second end portion 42.

In the above embodiment, the fixing members 50 are fixed to the vehicle body V1 by the fixing pieces 62 that extend from the attachment surface V2 toward the ground, but there is no limitation thereto, and the fixing members 50 may be fixed using another configuration. A configuration may be adopted in which, for example, the fixing members 50 are fixed to the attachment surface V2 via other attachment brackets. In addition, for example, a configuration may also be adopted in which each fixing member 50 includes a fitting portion that is fitted into an attachment hole formed in the attachment surface V2, and the fixing member 50 is fixed to the attachment surface V2 by fitting the fitting portion into the attachment hole.

The path regulating member 40 may be made of metal. The path regulating member 40 may be made of a metal material that is iron-based, copper-based, aluminum-based, or the like. With such a configuration, for example, when the path regulating member 40 is disposed at a position near a heat source of the vehicle, it is possible to suppress an increase in temperature inside the exterior member 30, and accordingly, an increase in the temperature of the electric wire member 20.

The exterior member 30 may be formed by a metal layer containing a metal material provided on the outer surface of a corrugated tube. Such a metal layer can be provided through plating, for example. It is preferable that the metal layer is provided over all outer surfaces of the annular protrusions 31 and the annular recesses 32 of the corrugated tube. A metal material that has a small radiation factor such as aluminum is preferably used for the outermost surface of the metal layer, for example. With such a configuration, for example, when the exterior member 30 is disposed at a position near a heat source of the vehicle, it is possible to suppress an increase in temperature inside the exterior member 30, and accordingly, an increase in the temperature of the electric wire member 20.

The exterior member 30 may include a slit that extends along the lengthwise direction of the exterior member 30 over the entire length of the exterior member 30. In this case, the exterior member 30 is preferably sealed over the entirety in the circumferential direction, for example, by winding tape around the outer periphery of the exterior member 30 so as to block the slit over the entire length thereof. Accordingly, it is possible to suppress a decrease in the water blocking properties of the exterior member that includes the slit.

The electric wire member 20 may include one electric wire 21, or may include three or more electric wires 21.

The braided member 24 may be omitted from the electric wire member 20.

The wire harness 10 may include a plurality of path regulating members 40 spaced apart from each other in the lengthwise direction of the exterior member 30.

The path regulating member 40 is not limited to a path regulating member provided under the floor of the vehicle V. The path regulating member 40 may be provided in the vehicle interior of the vehicle V, as long as it is provided at a portion of the routing path of the electric wire member 20 that extends linearly, for example.

As shown in FIG. 5, the leading end 46 of the first end portion 41 and the leading end 47 of the second end portion 42 may oppose two end portions in the circumferential direction of the engagement portion 63. In a state where the path regulating member 40 is held by the fixing members 50, a gap in the circumferential direction may be formed between the first end portion 41 and the engagement portion 63 and between the second end portion 42 and the engagement portion 63.

As shown in FIG. 2, the surface of the leading end 46 of the first end portion 41 may have an arc shape that is smoothly continuous with the surface of the protruding portion 45 of the first end portion 41 when viewed from the lengthwise direction of the path regulating member 40. In other words, the leading end 46 and the protruding portion 45 of the first end portion 41 may have arc-shaped surfaces that extend on the same circumference when viewed from the lengthwise direction of the path regulating member 40. Similarly, the surface of the leading end 47 of the second end portion 42 may have an arc shape that is smoothly continuous with the surface of the protruding portion 45 of the second end portion 42. In other words, the leading end 47 and the protruding portions 45 of the second end portion 42 may have arc-shaped surfaces that extend on the same circumference when viewed from the lengthwise direction of the path regulating member 40. Note that, the first end portion 41 may be referred to as a "first edge portion", and the second end portion 42 may be referred to as a "second edge portion". In addition, one of the pair of protruding portions 45 may be referred to as a "first protruding portion", and the other of the pair of protruding portions 45 may be referred to as a "second protruding portion".

As shown in FIGS. 2 and 3, the insertion port 44 is a groove that extends linearly along the lengthwise direction of the path regulating member 40 over the entire length of the path regulating member 40, and the groove may be open at two ends in the lengthwise direction of the path regulating member 40. In a state where the path regulating member 40 is held by the fixing members 50, the entire insertion port 44 may face a side on which the attachment surface V2 is provided, for example, the side opposite to the ground. The path regulating member 40 may cover the exterior member 30 from the opposite side to the attachment surface V2, for example, the ground side. The path regulating member 40 may be referred to as a "path defining member" that defines a path of the electric wire member 20.

As shown in FIGS. 3 and 5, the engagement portion 63 may protrude from the vehicle body opposing portion 64 on the side opposite to the attachment surface V2. The leading end surface of the engagement portion 63 may have an arc shape disposed on the same circumference as an arc defined by the inner surface of the coupling portion 43 when viewed from the lengthwise direction of the path regulating member 40. The leading end surface of each protrusion 65 has an arc shape that forms a portion of a circle that is concentric with an arc defined by the leading end surface of the engagement portion 63. The thickness in the radial direction of the coupling portion 43 may be constant in the circumferential direction. As shown in FIG. 6, in a state where the path regulating member 40 is held by the fixing members 50, at least a portion of the leading end surface of the protrusions 65 may come into contact with the outer peripheral surface of the annular protrusions 32.

As shown in FIG. 6, each fixing member 50 may include a plurality of engagement portions 63 that are disposed with a space therebetween in the lengthwise direction of the path regulating member 40. Narrow portions 65 may be provided at an interval (pitch) that is the same as the interval at which the annular recesses 32 are provided, or an interval of an integer multiple thereof, in the lengthwise direction of the path regulating member 40. The width along the lengthwise direction of each narrow portion 65 may be smaller than the width of an annular recess 32, in other words, the distance between adjacent annular protrusions 31.

The present disclosure encompasses the following aspects. Reference signs of several constituent elements of exemplary embodiments are added to aid in comprehension, not for limitation. Some of the items described in the following aspects may be omitted, and some of the items described in the aspects may be selected or extracted and combined.

[Supplementary Note 1] In one aspect of the present disclosure, the protruding portions (45) respectively protrude from the inner surfaces of the leading end of the first end portion (41) and the leading end of the second end portion (42), and when viewed in the lengthwise direction of the path regulating member (40), the surface of the leading end (46) of the first end portion (41) may have an arc shape smoothly continuous with the surface of the protruding portion (45), and the surface of the leading end (47) of the second end portion (42) may have an arc shape smoothly continuous with the surface of the protruding portion (45).

[Supplementary Note 2] In one aspect of the present disclosure, the leading end surface of the engagement portion (63) has an arc shape disposed on the same circumference of an arc defined by the inner surface of the coupling portion (43), the leading end surface of the protrusion (65) has an arc shape that forms a portion of a circle that is concentric with an arc defined by the leading end surface of the engagement portion (63), and at least a portion of the leading end surface of the protrusion (65) may come into contact with the outer peripheral surface of the annular protrusion (32) in a state where the path regulating member (40) is held by the fixing members (50).

[Supplementary Note 3] In one aspect of the present disclosure, the fixing member (50) may include a plurality of engagement portions (63) that are spaced apart in the lengthwise direction of the path regulating member (40).

[Supplementary Note 4] In one aspect of the present disclosure, the narrow portions (65) may be provided at an interval that is the same as the interval at which the annular recesses 32 are provided, or an interval of an integer multiple thereof, in the lengthwise direction of the path regulating member (40).

The invention claimed is:

1. A wire harness comprising:
an electric wire;
an exterior tube that covers an outer periphery of the electric wire;
a path regulator that extends along a lengthwise direction of the exterior tube while covering a circumferential portion of an outer periphery of the exterior tube, and regulates a path along which the electric wire is routed;
a fixing member that holds the path regulator and is fixed to a vehicle body; and
a slide regulator that regulates movement of the path regulator relative to the exterior tube in the lengthwise direction of the exterior tube, wherein
the path regulator includes:
an insertion port that is an opening that extends along a lengthwise direction of the path regulator over an entire length of the path regulator and is configured to enable the exterior tube to be inserted thereinto, and
a first end and a second end that are positioned on opposite sides to each other in a circumferential direction of the path regulator, and form the insertion port,
the fixing member includes an engagement that protrudes toward the insertion port,
the engagement is configured to abut at least one of the first end and the second end and stop rotation of the path regulator in the circumferential direction of the path regulator, and
the path regulator is allowed to move relative to the fixing member in the lengthwise direction of the exterior tube in a case where the slide regulator is not attached.

2. The wire harness according to claim 1,
wherein the engagement includes a narrow portion whose width decreases toward a leading end side of the engagement when viewed from the lengthwise direction of the path regulator.

3. The wire harness according to claim 1,
wherein the fixing member includes:
a main body, and
a lid that is fixable to the main body, and encloses and holds the path regulator in cooperation with the main body while fixed to the main body.

4. The wire harness according to claim 1,
wherein the engagement protrudes from a vehicle body opposing portion that opposes an attachment surface of the vehicle body.

5. The wire harness according to claim 1,
wherein the fixing member is one of a plurality of fixing members provided in the lengthwise direction of the path regulator.

6. The wire harness according to claim 1, wherein:
the exterior tube is a corrugated tube that has a bellows structure in which an annular protrusion and an annular recess are alternately provided in a continuous manner along the lengthwise direction of the exterior tube, and
the engagement includes a protrusion that enters the annular recess.

7. The wire harness according to claim 1,
wherein the path regulator includes a first protrusion that protrudes from an inner surface of the first end and a second protrusion that protrudes from an inner surface of the second end toward the exterior tube, and both come into contact with an outer surface of the exterior tube.

8. The wire harness according to claim 7,
wherein the first protrusion and the second protrusion protrude, respectively, from an inner surface of a leading end of the first end and a leading end of the second end.

* * * * *